United States Patent [19]

Harper et al.

[11] 4,298,580

[45] Nov. 3, 1981

[54] SEPARATION OF COBALT AND MANGANESE FROM TRIMELLITIC ACID PROCESS RESIDUE BY PRECIPITATING AS CARBONATES, REDISSOLVING AS HALIDES AND REMOVING COBALT BY MAGNETIC MEANS

[75] Inventors: Jon J. Harper, Naperville; Stephen J. Pietsch, Oak Park, both of Ill.

[73] Assignee: Standard Oil Company (Indiana), Chicago, Ill.

[21] Appl. No.: 218,061

[22] Filed: Dec. 19, 1980

[51] Int. Cl.$^3$ .................. C01G 45/06; C01G 51/08
[52] U.S. Cl. .................................. 423/40; 423/140; 423/150; 423/151; 75/119; 562/414
[58] Field of Search .............. 423/140, 144, 150, 151, 423/49, 50; 75/119; 562/413, 414

[56] References Cited

U.S. PATENT DOCUMENTS

| | | | |
|---|---|---|---|
| 2,865,708 | 12/1958 | Dinsmore | 423/40 |
| 3,341,470 | 9/1967 | Hensley | 562/414 |
| 3,673,154 | 6/1972 | Trevillyan | 423/140 |
| 3,865,871 | 2/1975 | Horie | 562/414 |
| 3,873,468 | 3/1975 | Kobinata | 562/414 |
| 3,880,920 | 4/1975 | Wampfler | 423/140 |
| 3,956,175 | 5/1976 | Shigeyasu | 423/50 |

*Primary Examiner*—Brian E. Hearn
*Attorney, Agent, or Firm*—Fred R. Ahlers; William T. McClain; William H. Magidson

[57] ABSTRACT

Recovery of cobalt and manganese from residue of trimellitic acid manufacture and recovery as 4-carboxyphthalic anhydride by extracting the residue with an aqueous alkaline solution containing carbonate ions which leaves a precipitate of metal carbonates, dissolving said precipitate as the metal chlorides, and at an upwardly adjusted pH adding powdered manganese to precipitate metallic cobalt and separating it by magnetic means.

11 Claims, No Drawings

SEPARATION OF COBALT AND MANGANESE FROM TRIMELLITIC ACID PROCESS RESIDUE BY PRECIPITATING AS CARBONATES, REDISSOLVING AS HALIDES AND REMOVING COBALT BY MAGNETIC MEANS

This invention relates to the recovery of cobalt and manganese from residues of trimellitic acid manufacture by the oxidation with molecular oxygen of liquid pseudocumene in the presence of catalysis provided by ions of bromine in combination with ions of cobalt and manganese or cobalt, manganese and cerium as metal oxidation catalysts and the removal of substantial trimellitic acid and, if used, reaction solvent. More specifically, the present invention pertains to the recovery of said metals from said residue by mixing it with an alkaline aqueous solution containing carbonate ions thereby dissolving acidic aromatic compounds and precipitating the catalyst metals as carbonates, separating the solution for discard or preferably for recovering its trimellitic acid content, redissolving said metals as their halides, at least adjusting the solution of halides to pH of 6 and adding thereto manganese metal to precipitate metallic cobalt, and separating metallic cobalt from the pH 6 solution by magnetic separator.

STATE OF THE ART

No publication has been found which discloses or suggests the foregoing combination of steps for processing a trimellitic acid process residue for the recovery of its contents of cobalt and manganese as well as the separation of them from one another.

It is acknowledged that each step of the foregoing combination may well be individually known. However, what was not before known was the combination of steps and their operating conditions for the benefits and purposes of the process of the present invention as applied to the manufacture of trimellitic acid. Such benefits and purposes can be better understood from the background of the present invention to follow.

BACKGROUND OF THE INVENTION

It is important to the manufacture of trimellitic acid by the catalytic oxidation of liquid pseudocumene with a source of molecular oxygen (e.g., air) to have cobalt, the most expensive metal oxidation catalyst, recovered and recycled to the liquid phase oxidation. For the liquid phase oxidation of methyl-substituted benzenes in general, it is known that the use of manganese with cobalt as the catalyst metal enhances the production of the benzene carboxylic acid, especially when bromine is the oxidation promoter, more than the sum of the effects of cobalt or manganese alone with bromine. Cobalt has the highest activity of the two metals. Cerium can be used with or to replace part of the cobalt without any loss of the activity due to cobalt especially for the oxidation of liquid pseudocumene to trimellitic acid. But, for such oxidation of pseudocumene to maximize trimellitic acid production and minimize co-product ion of methyl-substituted phthalic acids (partial oxidation products) as difficultly removable impurities, the manganese component of the Co-Mn-Br or Co-Ce-Mn-Br systems of catalysis is either not added at the start of the oxidation of pseudocumene when all of the cobalt is added or only a portion of the manganese is added at that time. According to U.S. Pat. No. 3,491,144 the addition of manganese is delayed until 50 to 55 percent of the oxidation is complete (i.e., 2 to 2.5 moles of oxygen consumed per mole of pseudocumene) and then manganese is added for its oxidation-enhancing ability. Also, according to U.S. Pat. No. 3,683,016 a portion of the manganese is used initially with cobalt and some of the cerium and the remainder of the manganese and cerium are added to distinct, separately operated oxidation steps, for example, one or two additional steps (a total of two to three steps) operated in series sequence. In such a process the amount of manganese and cerium added to each step is equal to the reciprocal of the total number of steps used.

Thus, to take advantage of the benefits of such staged addition of manganese and still be able to recover and reuse the expensive cobalt component of catalysis for the pseudocumene's oxidation, it is important to be able not only to recover cobalt from a residue of the manufacture of trimellitic acid but also to be able to separate cobalt from manganese which is so recovered. Such recovery and separation of cobalt and manganese can be accomplished by the inventive method to be next defined and described.

SUMMARY OF THE INVENTION

We have devised a novel method of recovery of cobalt and manganese from a residue of trimellitic acid manufacture and the separation of recovered cobalt from recovered manganese. Such method is a combination of the steps of dissolving the organic acidic components of the residue as sodium, potassium, or preferably ammonium salts in water also containing carbonate ions to also precipitate the catalyst metals as carbonates; recovering the metal carbonates by their separation from the solution of salts of organic acidic components through the use of means for solid-liquid separation (e.g., filter, centrifuge, settler, etc.); redissolving the metals in water as their halide salts, preferably at a pH of 4 to reject a precipitate of iron, if it is present as a contaminant metal from corrosion of iron-containing process apparatus; adjusting, at least once, the pH of the aqueous solution of catalyst metal halides to a pH of from 5 to 6; adding to the pH-adjusted solution powdered manganese in an amount of from 1.0 up to 2.0, preferably 1.3 up to 1.8, chemical equivalents (gram atoms) per 1.0 chemical equivalent (gram atom) of cobalt in solution to precipitate metallic cobalt; and separating metallic cobalt from the pH 6 solution by a magnetic separator.

It is preferred to form the metal carbonates in two steps. The first step combines the residue as a hot fluid (230° to 235° C.), which is the form in which it is obtained, with an aqueous solution of alkaline sodium, potassium, or ammonium hydroxide solution at a temperature of 25° to 35° C. in an amount to provide a final solution having a pH of about 7, cooling the resulting mixture to a temperature of from 75° to 100° C. by indirect heat exchange with the solution separated from the precipitate of metal carbonates to heat such solution of metal carbonates to a temperature of from 50° C. up to 150° C. at a gauge pressure of from 1 kg/cm² up to 5 kg/cm². The second step in the metal carbonate precipitation comprises adding an alkaline source of carbonate ion to the pH 7 first-step solution after it has been cooled. This two-step sequence prevents frothing of the aqueous medium, which can be rather extensive and render the metal carbonate precipitation of questionable commercial feasibility. For the carbonate precipitation the carbonates and bicarbonates of sodium, potassium, or ammonia can be used.

For both of the above preferred two-step metal carbonate precipitations the preferred hydroxide and carbonate are ammonium hydroxide and ammonium bicarbonate and/or carbonate. Such ammonium reactants are preferred because they do not add to the problem of disposal of solid wastes. A preferred additional processing step comprises recovering the trimellitic acid values of the residue starting material by subjecting the separated solution of salts of the organic acidic components (40 to 70 wt. %) of the residue to evaporation to recover a purified trimellitic acid anhydride product. For such anhydride product recovery at least two series-connected steps of wiped-film evaporation conducted at subatmospheric pressure can be used.

It is preferred to redissolve the catalyst metals by the use of hydrochloric acid rather than hydrobromic acid because the latter can be used to dissolve the precipitated metallic cobalt for its reuse in the oxidation of liquid pseudocumene to supply both the cobalt and bromine components of catalysis.

The recovered manganese remains in solution then as its chloride after precipitation and recovery of metallic cobalt and, since such solution is substantially free of organics and can be made free of contaminant iron, the manganese chloride can be used as a source of manganese in its staged addition to liquid pseudocumene oxidation without affecting the bromine to metal ratio (e.g., making it too high), as might be the case when manganese bromide is formed and so used in the oxidation process. However, if the bromine to total metal (gram atom) ratio desired exceeds 2:1, then the dissolution of the metal carbonate's precipitate can, of course, be made with hydrobromic acid.

When contaminant iron is present from the aforementioned corrosion, then the dissolution of the catalyst metals with either hydrobromic or hydrochloric acid is conducted to a pH of 3 to 4 to leave behind an insoluble form of iron which can be readily removed by conventional means for solid-liquid separation (e.g., by a filter, centrifuge or settler). Thereafter, the solution of redissolved cobalt and manganese so separated from the iron precipitate has its pH increased to pH of 6, preferably with ammonia or ammonium hydroxide to minimize carryforward of extraneous materials with the manganese. When the solution's pH reaches 6 the powdered manganese is added to precipitate metallic cobalt for its recovery by magnetic separator.

The following TABLE I provides examples of analyses of residues from the manufacture of trimellitic acid (TMLA) per se or its acid anhydride (TMA). Said analyses do not account for the anion of the catalyst metals nor do they account for corrosion metals. Analyses showing a more complete accounting of catalyst and corrosion (Fe) metals are later presented.

TABLE 1

CHARACTERIZATION OF RESIDUES FROM THE MANUFACTURE OF TRIMELLITIC ACID AND ANHYDRIDE

| COMPONENT, IN WEIGHT % | RESIDUE TMLA | TMA |
|---|---|---|
| Acetic Acid | 1.58 | 0 |
| Phthalic Acid | 12.3 | 1.0 |
| Toluic Acid | 0 | 0 |
| Aldehydes | 0.53 | 1.4 |
| Benzoic Acid | 0.5 | 0 |
| Trimellitic Acid | 38.6 | 65.2[1] |
| OLB Compounds[2] | 4.7 | 1.9 |
| HB Compounds[3] | 0.94 | 0.4 |
| Cobalt | 1.17 | 2.51 |
| Manganese | 0.28 | 0.87 |
| Bromine | 0.94 | 0.15 |

[1]Trimellitic acid anhydride.
[2]"OLB Compounds" are other lower boiling compounds.
[3]"HB Compounds" are higher boiling (higher than trimellitic acid) compounds.

TABLE II

CATALYST AND CORROSION (FE) METALS CONTENT OF TMA PROCESS RESIDUES

| Co | Fe | Mn | Ce |
|---|---|---|---|
| 1.19 | 0.05 | 0.71 | 0.69 |
| 0.77 | 0.05 | 0.37 | 0.16 |

The following examples illustrate the presently believed best mode of conduct of the present invention including the extension thereof to the dissolving of separated metallic cobalt for its recycle to pseudocumene oxidation.

EXAMPLES 1 AND 2

A residue from the manufacture of trimellitic acid and its recovery as trimellitic acid anhydride contains 0.625 weight percent cobalt, 0.31 weight percent manganese, 0.108 weight percent cerium, and about 0.05 weight percent iron. Such residue at 2.4 kg/hr at a temperature of from 230° C. to 235° C. is combined with 3.9 kg/hr of aqueous ammonium hydroxide containing 0.444 kg/hr of ammonium hydroxide in a closed vessel equipped with a stirrer and maintained at a pressure of 30 kg/cm$^2$ gauge pressure. The residue dissolves in the resulting hot solution. This hot solution is pumped through a heat exchanger and is cooled to 150° C. by indirect heat exchange with about 7.8 kg/hr of aqueous solution of ammonium salts or about 7.93 kg/hr of aqueous solution of ammonium and sodium salts of the organic acidic materials from the residue later obtained following the next two steps. Such indirect heat exchange adds back a substantial amount of the heat brought into the process by the hot (230°-235° C.) residue and the heat of reaction of the dissolution. Such added heat, advantageously, can be used to recover ammonia values.

The cooled (75°-100° C.) solution of the residue, 6.28 kg/hr, is either combined with 1.65 kg/hr of aqueous solution containing 20 wt.% sodium carbonate or preferably combined with 1.617 kg/hr of aqueous solution of ammonium carbonate (19.4 wt.% ammonium carbonate). The resulting mixtures are stirred to maintain the precipitating metal carbonates in suspension. The suspensions are then pumped through means for effecting solid-liquid separation (e.g., filter, centrifuge, settler, etc.). In this manner, 0.421 kg/hr of wet solids containing carbonates of 0.013 kg cobalt, 0.006 kg manganese, 0.001 kg iron and 0.002 kg cerium are collected and the separated aqueous solution of ammonium and sodium salts or the separated preferred aqueous solution of ammonium salts is discharged from the means for solid-liquid separation and used to extract heat from the step of dissolving the residue as before mentioned. The reheated, separated solution containing the mixture of sodium and ammonium salts is sent to waste treatment by either a combination of aerobic and anaerobic digestions or by incineration. The reheated separated solution of only ammonium salt can be concentrated by removal of water and some ammonia and then concentrated further (e.g., by heating in a kiln) to drive off the remaining water and ammonia. The ammonia can be recovered by conventional means for forming and recovering ammonium hydroxide for reuse in the residue dissolution and for preparing ammonium carbonate.

The 0.421 kg/hr of wet metal carbonates collected is combined with aqueous hydrochloric acid (35 to 37 wt.% HCl) or hydrobromic acid (45 to 48 wt.% HBr) in an amount to dissolve the metals as their chlorides or bromides and produce an acidic solution of pH 3 to 4 and precipitate contaminant (from process apparatus corrosion) iron. The iron precipitate, an oxide, is removed by means for solid-liquid separation and discarded. To dissolve the carbonates as their chlorides or bromides, preferably as their chlorides, and provide the iron precipitate at pH 3 to 4, requires 0.27 kg/hr of hydrochloric acid (35 wt.% HCl) together with 0.76 kg/hr of water or 0.437 kg/hr hydrobromic acid (48 wt.% HBr) and 0.71 kg/hr of water.

The iron-free solution of the catalyst metal chlorides or bromides, 1.427 kg/hr of the preferred solution of the chlorides, is combined with aqueous ammonium hydroxide, sodium hydroxide or potassium hydroxide to produce a solution pH of 5.5 to 6 (about 0.001 kg/hr of preferred ammonium hydroxide) and 0.014 kg/hr of powdered manganese. This produces a suspension of about 0.011 kg/hr of metallic cobalt.

The suspension of metallic cobalt is separated by passing the suspension over a magnetic separator which collects the metallic cobalt. The cobalt-free solution of manganese and cerium chlorides is concentrated to 1–10 wt.% manganese chloride and used to supply manganese catalyst component.

The collected metallic cobalt, 0.011 kg/hr, is dissolved as its bromide by the use of 0.062 kg/hr of hydrobromic acid (48 wt% HBr). The resulting solution contains 0.011 kg/hr of cobalt, 0.03 kg/hr of bromine and 0.032 kg/hr of water. Such solution can be combined with acetic acid (3 wt% water) and pseudocumene to supply the needs of the first oxidation step for the manufacture of trimellitic acid.

Since the bromide to total metal ratio is not used in a 2:1 gram atom ratio for pseudocumene oxidation it is preferred to recover and separate cobalt and manganese in either their respective chloride and bromide or their bromide and chloride forms. This leaves the bromide to total metal ratio in the 1:1 gram atom ratio and any variance therefrom can be adjusted by the presence of free HBr in the solution of the catalyst metal bromide, since the initial catalysis system is, substantially, Co-Br, it is most preferred to separate and recover cobalt as its bromide and separate and recover manganese as its chloride.

The invention claimed is:

1. A method of recovering cobalt and manganese and separating recovered cobalt from recovered manganese from residue obtained from the manufacture of trimellitic acid produced by the oxidation of liquid pseudocumene with molecular oxygen in the presence of cobalt and manganese as the metal oxidation catalyst; which method of recovery and separation comprises dissolving the acidic organic components of said residue in water containing carbonate ion together with sodium, or potassium, or ammonium ions and precipitating catalyst metals as carbonates; separating the aqueous solution from the metal carbonate precipitate; redissolving the catalyst metals as their halides by mixing the carbonate precipitate with an aqueous solution containing hydrochloric or hydrobromic acid in an amount to provide a solution pH of 3 to 4 thereby precipitating iron, if present,; thereafter adjusting the precipitate-free solution's pH to 5 to 6 and adding powdered manganese thereto in an amount of from 1 to 2 chemical equivalents for each 1.0 chemical equivalent of cobalt in solution thereby precipitating metallic cobalt; and magnetically separating the pH-adjusted solution from the metallic cobalt precipitate.

2. The recovery and separation method of claim 1 wherein the dissolution of acidic organic components of the residue is accomplished with sodium carbonate.

3. The recovery and separation method of claim 1 wherein the dissolution of acidic organic components of the residue are dissolved by the use of ammonium carbonate.

4. The recovery and separation method of claim 2 wherein the adjustment of solution pH of up to from pH 5 to pH 6 is accomplished with sodium or potassium hydroxide.

5. The recovery and separation method of claim 2 wherein the adjustment of solution pH of up to from pH 5 to pH 6 is accomplished with ammonium hydroxide.

6. The recovery and separation method of claim 3 wherein the adjustment of solution pH of up to pH 5 to pH 6 is accomplished with sodium or potassium hydroxide.

7. The recovery and separation method of claim 3 wherein the adjustment of solution pH of up to from pH 5 to pH 6 is accomplished with ammonium hydroxide.

8. The recovery and separation method of claim 3 wherein metallic cobalt is dissolved as its bromide.

9. The recovery and separation method of claim 4 wherein metallic cobalt is dissolved as its bromide.

10. The recovery and separation method of claim 5 wherein the metallic cobalt is dissolved as its bromide.

11. The recovery and separation method of claim 6 wherein the metallic cobalt is dissolved as its bromide.

* * * * *